(12) United States Patent
Cheon

(10) Patent No.: US 11,479,269 B2
(45) Date of Patent: *Oct. 25, 2022

(54) APPARATUS FOR ASSISTING DRIVING OF A VEHICLE AND METHOD THEREOF

(71) Applicant: MANDO CORPORATION, Pyeongtaek-si (KR)

(72) Inventor: Seunghan Cheon, Seongnam-si (KR)

(73) Assignee: HL Klemove Corp., Incheon (KR)

( * ) Notice: Subject to any disclaimer, the term of this patent is extended or adjusted under 35 U.S.C. 154(b) by 81 days.

This patent is subject to a terminal disclaimer.

(21) Appl. No.: 17/079,874

(22) Filed: Oct. 26, 2020

(65) Prior Publication Data

US 2021/0206398 A1 Jul. 8, 2021

Related U.S. Application Data

(63) Continuation of application No. 16/776,691, filed on Jan. 30, 2020, now Pat. No. 10,906,559.

(30) Foreign Application Priority Data

Jan. 6, 2020 (KR) ........................ 10-2020-0001248

(51) Int. Cl.
*B60W 60/00* (2020.01)
*G06V 20/58* (2022.01)
*G06V 20/56* (2022.01)

(52) U.S. Cl.
CPC .. *B60W 60/00276* (2020.02); *B60W 60/0025* (2020.02); *G06V 20/58* (2022.01); *G06V 20/588* (2022.01)

(58) Field of Classification Search
CPC ....... B60W 60/00276; B60W 60/0025; B60W 2552/53; B60W 2554/4048;

(Continued)

(56) References Cited

U.S. PATENT DOCUMENTS 9,336,436 B1 5/2016 Dowdall
9,505,412 B2 11/2016 Bai
(Continued)

FOREIGN PATENT DOCUMENTS

JP 4163205 B2 8/2008
KR 10-2018-0085532 A 7/2018

OTHER PUBLICATIONS

Notice of Allowance dated Oct. 5, 2020 in U.S. Appl. No. 16/776,691.

(Continued)

*Primary Examiner* — Rami Khatib
(74) *Attorney, Agent, or Firm* — Morgan, Lewis & Bockius LLP

(57) ABSTRACT

An apparatus for assisting driving of a vehicle includes a camera mounted to the vehicle for viewing an area in front of the vehicle, a radar sensor mounted to the vehicle to sense around the vehicle, and a controller connected to the camera and/or the radar sensor to detect obstacles and perform collision avoidance control. The controller is further configured to recognize a first obstacle approaching in a lateral direction from an outside of a driving lane of the vehicle, generate and store a collision avoidance path for avoiding collision with the first obstacle, recognize a third obstacle passing behind a second obstacle in the lateral direction after the recognition of the first obstacle is interrupted by the second obstacle, and perform collision avoidance control of the vehicle based on a similarity between the first obstacle and the third obstacle and based on the stored collision avoidance path.

28 Claims, 13 Drawing Sheets

(58) Field of Classification Search
CPC ....... B60W 2554/4049; B60W 30/095; B60W 30/09; B60W 2420/42; B60W 2420/52; B60W 2554/4029; B60W 30/08; B60W 40/02; B60W 50/14; B60W 2050/143; B60W 10/18; B60W 40/105; B60W 2520/10; B60W 2552/50; G06V 20/58; G06V 20/588; G01S 2013/9315; G01S 13/867; G01S 2013/93271; G01S 13/931; B60R 21/0134; B60Y 2300/08

See application file for complete search history.

(56) References Cited

U.S. PATENT DOCUMENTS

| | | |
|---|---|---|
| 10,281,920 B2 | 5/2019 | Frazzoli |
| 2009/0303026 A1 | 12/2009 | Broggi |
| 2011/0246156 A1 | 10/2011 | Zecha |
| 2014/0324330 A1 | 10/2014 | Minemura |
| 2015/0206001 A1 | 7/2015 | Maurer |
| 2017/0262750 A1 | 9/2017 | Kozuka |
| 2018/0218227 A1 | 8/2018 | Takaki |
| 2018/0259968 A1* | 9/2018 | Frazzoli ............... G05D 1/0219 |
| 2018/0370502 A1 | 12/2018 | Wang |
| 2019/0369626 A1 | 12/2019 | Lui |
| 2019/0377354 A1 | 12/2019 | Shalev-Shwartz |

OTHER PUBLICATIONS

Non-Final Office Action dated Apr. 29, 2020 in U.S. Appl. No. 16/776,691.
Final Office Action dated Jul. 2, 2020 in U.S. Appl. No. 16/776,691.

* cited by examiner

APPARATUS FOR ASSISTING DRIVING OF A VEHICLE AND METHOD THEREOF

CROSS-REFERENCE TO RELATED APPLICATION(S)

The present application is a continuation of U.S. patent application Ser. No. 16/776,691, filed on Jan. 30, 2020 which claims priority to and the benefit of Korean Patent Application No. 10-2020-0001248, filed on Jan. 6, 2020 which is incorporated herein by reference in its entirety.

TECHNICAL FIELD

Apparatuses and methods consistent with exemplary embodiments relate to an apparatus for assisting driving of a vehicle and method thereof, and more specifically relate to an apparatus for preventing a collision that may occur when a pedestrian hidden behind an obstacle suddenly appears after passing the obstacle.

BACKGROUND

A vehicle is a common machine having wheels and that travels on roads for the purpose of transporting people or cargo. Such a vehicle may cause an accident due to its own failure, or an accident may occur due to a driver's carelessness or an error of another vehicle or road condition.

Recently, various driver assistance systems (ADAS) have been developed to transmit driving information of a vehicle and other alerts and information to a driver to prevent accidents caused by a driver's carelessness. The ADAS systems can also support autonomous driving for the convenience of the driver.

Examples of advanced driver assistance systems mounted on a vehicle include an Autonomous Emergency Braking (AEB) system. Such a system determines a collision risk with an opposing vehicle, a crossing vehicle, or a pedestrian based on data obtained from a camera or a radar sensor provided in the vehicle, and assists in avoiding a collision through emergency braking and/or steering control.

However, since the AEB system determines a collision risk and performs emergency braking and steering control based on data obtained from a camera or radar sensor provided in a vehicle, the system may be unable to avoid a collision when a pedestrian is in a blind spot obstructed by obstacles or suddenly comes out of the blind spot and appears in front of a vehicle. For example, in such a situation, it is difficult to avoid the collision because a braking or steering time for collision avoidance is delayed.

SUMMARY

It is an aspect of one or more exemplary embodiments to a driver assistance apparatus and a method for quickly and accurately performing collision avoidance control for avoiding a collision when a pedestrian, that passed through a blind spot that is obstructed from view by an obstacle, suddenly appears in front of the vehicle.

Additional aspects of the exemplary embodiments will be set forth in part in the description which follows and, in part, will be obvious from the description, or may be learned by practice of the exemplary embodiments.

According to an aspect of an exemplary embodiment, an apparatus for assisting driving of a vehicle includes an image acquisition device mounted to a vehicle and having a field of view extending in front of the vehicle to obtain image data, a radar sensor mounted to the vehicle to obtain radar data around the vehicle, and a controller including at least one processor and communicatively connected to at least one of the image acquisition device or the radar sensor to detect obstacles and perform collision avoidance control of the vehicle. The controller is configured to recognize a first obstacle approaching in a lateral direction from an outside of a driving lane of the vehicle based on at least one of the image data or the radar data, generate a collision avoidance path for avoiding collision between the vehicle and the first obstacle, and store the generated collision avoidance path and information of the first obstacle. The controller further recognizes a third obstacle that passes behind a second obstacle located between the first obstacle and the vehicle in the lateral direction after the recognition of the first obstacle is interrupted by the second obstacle, and performs collision avoidance control of the vehicle based on a similarity between the first obstacle and the third obstacle and based on the stored collision avoidance path.

The controller may recognize as the first obstacle an obstacle having a lateral speed greater than a pre-determined speed.

The controller may recognize as the first obstacle an obstacle having an estimated time of arrival to the driving lane of the vehicle less than a pre-determined time.

The controller may determine a Time to Collision (TTC) between the detected obstacles and the vehicle based on a longitudinal speed of the vehicle, and recognize an obstacle having a TTC less than a pre-determined time as the first obstacle.

The controller may only perform the collision avoidance control based on the stored collision avoidance path if the third obstacle is recognized and the vehicle passes the second obstacle in the longitudinal direction.

The controller may determine the similarity between the first obstacle and the third obstacle by comparing the stored information of the first obstacle with the information of the recognized third obstacle.

The controller may determine the similarity between the first obstacle and the third obstacle by comparing at least one of a lateral speed, an area, or a color of each of the first obstacle and the third obstacle.

The controller may perform the collision avoidance control with full-braking of the vehicle if the similarity between the first obstacle and the third obstacle is determined to be greater than a first threshold value.

The controller may perform the collision avoidance control with partial-braking of the vehicle if the similarity between the first obstacle and the third obstacle is determined to be less than a first threshold value and greater than a second threshold value, the second threshold value being smaller than the first threshold value.

The controller may transmit a control signal for generating a warning signal if the similarity between the first obstacle and the third obstacle is determined to be greater than a third threshold value.

According to an aspect of another exemplary embodiment, a method for assisting driving of a vehicle includes recognizing a first obstacle approaching in a lateral direction from an outside of a driving lane of a vehicle based on at least one of image data obtained from an image acquisition device mounted to the vehicle or radar data obtained from a radar sensor mounted to the vehicle, generating a collision avoidance path for avoiding collision between the vehicle and the first obstacle, and storing the generated collision avoidance path and the information of the first obstacle. The method further recognizes a third obstacle that passes behind a second obstacle located between the first obstacle and the vehicle in the lateral direction after the recognition of the first obstacle is interrupted by the second obstacle, and performs collision avoidance control of the vehicle based on a similarity between the first obstacle and the third obstacle and based on the stored collision avoidance path.

The recognizing of the first obstacle may include: recognizing an obstacle having a lateral speed greater than a pre-determined speed as the first obstacle.

The recognizing of the first obstacle may include recognizing as the first obstacle an obstacle having an estimated time of arrival to the driving lane of the vehicle less than a pre-determined time.

The recognizing of the first obstacle may include determining a Time to Collision (TTC) between obstacles detected from the image data or the radar data and the vehicle based on a longitudinal speed of the vehicle, and recognizing an obstacle having a TTC less than a pre-determined time as the first obstacle.

The method for assisting driving of a vehicle may further include performing the collision avoidance control based on the stored collision avoidance path only if the third obstacle is recognized and the vehicle has not passed the second obstacle in the longitudinal direction.

The method for assisting driving of a vehicle may further include determining the similarity between the first obstacle and the third obstacle by comparing the stored information of the first obstacle with information of the recognized third obstacle.

The determining of the similarity between the first obstacle and the third obstacle may include comparing at least one of a lateral speed, an area, or a color of each of the first obstacle and the third obstacle.

The performing of collision avoidance control of the vehicle based on the stored collision avoidance path based on the similarity between the first obstacle and the third obstacle may include performing the collision avoidance control with full-braking of the vehicle if the similarity between the first obstacle and the third obstacle is determined to be greater than a first threshold value.

The performing of collision avoidance control of the vehicle based on the stored collision avoidance path based on the similarity between the first obstacle and the third obstacle may include performing the collision avoidance control with partial-braking of the vehicle if the similarity between the first obstacle and the third obstacle is determined to be less than a first threshold value and greater than a second threshold value, the second threshold value being smaller than the first threshold value.

The method for assisting driving of a vehicle may further include transmitting a control signal for generating a warning signal if the similarity between the first obstacle and the third obstacle is determined to be greater than a third threshold value.

According to another aspect of another exemplary embodiment, a driver assistance system of a vehicle includes one or more sensors configured to acquire sensing data of an area outside of the vehicle, and a controller comprising at least one processor configured to process the sensing data. The controller is configured to identify a first object moving towards a driving lane of the vehicle based on the acquired sensing data, and determine a collision avoidance response for avoiding collision with the first object, identify a third object moving towards the driving lane of the vehicle based on the acquired sensing data, after sensing of the first object by the one or more sensors has been interrupted, and perform collision avoidance based on the collision avoidance response for avoiding collision with the first object in response to determining a similarity between the identified third object and the first object.

According to a further aspect of another exemplary embodiment, a driver assistance method includes identifying a first object moving towards a driving lane of a vehicle based on sensing data acquired by one or more sensors of the vehicle sensing an area outside of the vehicle, and determining a collision avoidance response for avoiding collision with the first object, and identifying a third object moving towards the driving lane of the vehicle based on the acquired sensing data, after sensing of the first object by the one or more sensors has been interrupted. Collision avoidance is performed based on the collision avoidance response for avoiding collision with the first object in response to determining a similarity between the identified third object and the first object.

BRIEF DESCRIPTION OF THE DRAWINGS

These above and/or other aspects of the disclosure will become apparent and more readily appreciated from the following description of exemplary embodiments, taken in conjunction with the accompanying drawings in which.

DETAILED DESCRIPTION

Figure 1:
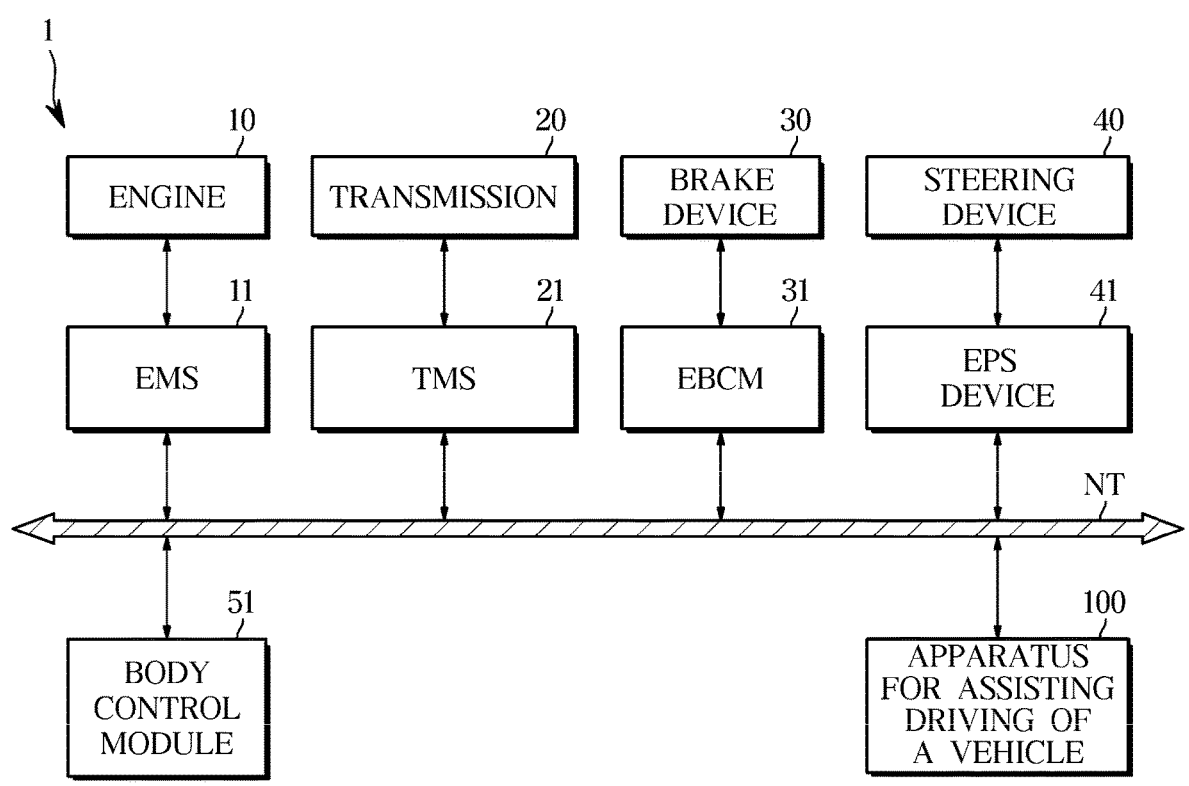
FIG. 1 is a block diagram of a vehicle according to one embodiment of the disclosure.

Reference will now be made in detail to the embodiments of the present disclosure, examples of which are illustrated in the accompanying drawings, wherein like reference numerals refer to like elements throughout. This specification does not describe all elements of the embodiments of the present disclosure as detailed descriptions of elements that are well known in the art or redundant descriptions on substantially the same configurations may be omitted.

The terms 'unit, module, member, and block' used herein may be implemented using a software or hardware component. According to an embodiment, a plurality of 'units, modules, members, or blocks' may also be implemented using a single element and one 'unit, module, member, or block' may include a plurality of elements. When implement as software, the functions described as being performed by a unit, module, member, or block can be performed by one or more processors executing machine-readable instructions stored in a non-transitory recording medium communicatively connected to the processor.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements disclosed in the specification, and are not intended to preclude the possibility that one or more additional elements may exist or may be added.

The terms 'first, second and third' used herein may be used to distinguish one element from another element, and the elements are not limited thereto.

The terminology used herein is for the purpose of describing particular embodiments only and is not intended to be limiting. As used herein, the singular forms "a," "an," and "the" are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout. The order of progress is not limited to the order in drawings unless the order of progress is explicitly described.

Throughout the specification, the term 'obstacle' may refer to any object that may be subject to collision with a vehicle, and may include moving objects such as other vehicles, pedestrians, cyclists, etc., as well as non-moving or stationary objects such as trees, street lamps, and structures.

Throughout the specification, the term 'lateral direction' may refer to a direction perpendicular to a moving direction of the vehicle, and the term 'longitudinal direction' may refer to a direction parallel to the moving direction of the vehicle.

Hereinafter, embodiments of the present disclosure will be described in detail with reference to the accompanying drawings.

FIG. 1 is a block diagram of a vehicle according to one embodiment of the disclosure. The vehicle 1 according to an exemplary embodiment may be a vehicle traveling in response to a driver's driving control or commands, or may be an autonomous vehicle traveling autonomously to a destination.

Referring to FIG. 1, the vehicle 1 may include an engine 10, a transmission 20, a brake device 30, and a steering device 40.

The engine 10 may include at least one cylinder and at least one piston, and may generate power needed to drive the vehicle 1. The transmission 20 may include a plurality of gears, and may transmit power generated by the engine 10 to wheels of the vehicle 1. The brake device 30 may decelerate or stop the vehicle 1 through frictional force on wheels. The brake device 30 may include one or more brake pads and brake shoes operative to decelerate or stop the vehicle 1. The steering device 40 may change the traveling direction of the vehicle 1.

The vehicle 1 may include a plurality of electronic constituent elements. For example, the vehicle 1 may further include an Engine Management System (EMS) 11, a Transmission Controller also referred to as a Transmission Control Unit (TCU) or transmission management system (TMS) 21, an Electronic Brake Controller also referred to as an Electronic Brake Control Module (EBCM) 31, an Electronic Power Steering (EPS) device 41, a Body Control Module (BCM), and an apparatus for assisting driving of a vehicle 100 included in a Driver Assistance System (DAS).

The EMS 11 may control the engine 10 in response to either the driver's acceleration intention from an acceleration pedal or a request signal from the driver assistance system (DAS) 100. For example, the EMS 11 may control torque of the engine 10.

The TMS 21 may control the transmission 20 in response to either a driver's gearshift command activated by a gearshift lever and/or a driving speed of the vehicle 1. For example, the TMS 21 may adjust or regulate a gearshift ratio from the engine 10 to wheels of the vehicle 1.

The electronic brake control module (EBCM) 31 may control a brake device 30 in response to either the driver's brake intention from a brake pedal or slippage of wheels or a request signal from the driver assistance system (DAS) 100. For example, the EBCM 31 may temporarily release wheel braking in response to wheel slippage detected in a braking mode of the vehicle 1, resulting in implementation of an Anti-lock Braking System (ABS). The EBCM 31 may selectively release braking of wheels in response to oversteering and/or understeering detected in a steering mode of the vehicle 1, resulting in implementation of Electronic Stability Control (ESC).

In addition, the EBCM 31 may temporarily brake wheels in response to wheel slippage detected by vehicle driving, resulting in implementation of a Traction Control System (TCS).

The electronic power steering (EPS) device 41 may assist the steering device 40 in response to the driver's steering intention from the steering wheel, such that the EPS device 41 may assist the driver in easily handling the steering wheel. For example, the EPS device 41 may assist the steering wheel 40 in a manner that steering force decreases in a low-speed driving mode or a parking mode of the vehicle 1 but increases in a high-speed driving mode of the vehicle 1. The EPS device 41 can further optionally control the steering device 40 in response to a request signal from the driver assistance system (DAS) 100.

The body control module 51 may control various electronic components that are capable of providing the driver with user convenience or guaranteeing driver safety. For example, the body control module 51 may control headlamps (headlights), wipers, an instrument or other cluster, a multifunctional switch, turn signal indicators, or the like.

The apparatus for assisting driving of a vehicle 100 may assist the driver in easily handling (e.g., driving, braking, and steering) the vehicle 1. For example, the DAS 100 may detect peripheral environments (e.g., a peripheral vehicle, pedestrian, cyclist, lane, traffic sign, or the like) of the vehicle 1 (i.e., host vehicle), and may perform driving, braking, and/or steering of the vehicle 1 in response to the detected peripheral environments.

The above-mentioned electronic components may communicate with each other through a vehicle communication network (NT). For example, the electronic components may perform data communication through Ethernet, Media Oriented Systems Transport (MOST), a FlexRay, a Controller Area Network (CAN), a Local Interconnect Network (LIN), or the like. For example, the DAS 100 may respectively transmit a drive control signal, a brake signal, and a steering signal to the EMS 11, the EBCM 31, and the EPS device 41 over the vehicle communication network (NT).

More detail elements of the apparatus for assisting driving of the vehicle 100 will be described below with reference to FIG. 2 and FIG. 3.

Figure 2:
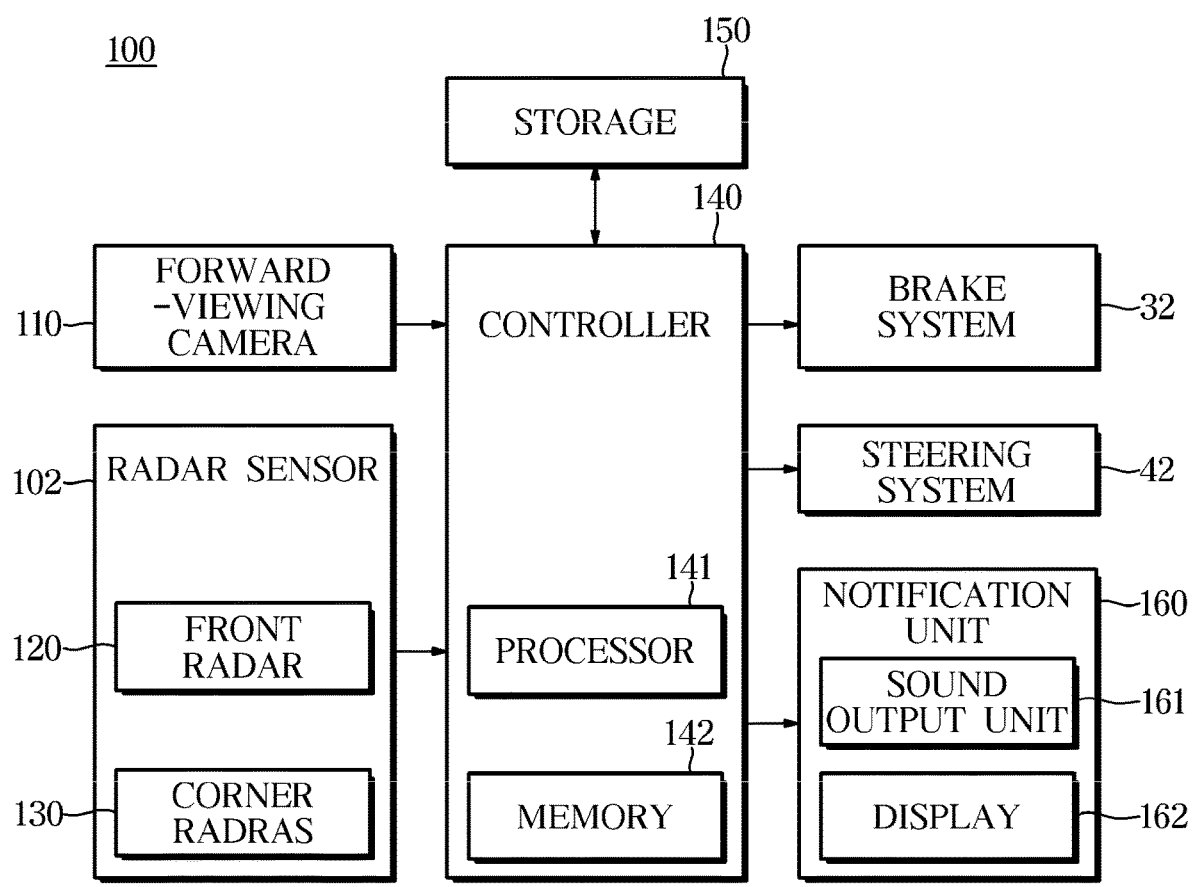
FIG. 2 is a block diagram of an apparatus for assisting driving of a vehicle according to one embodiment of the disclosure.
Figure 3:
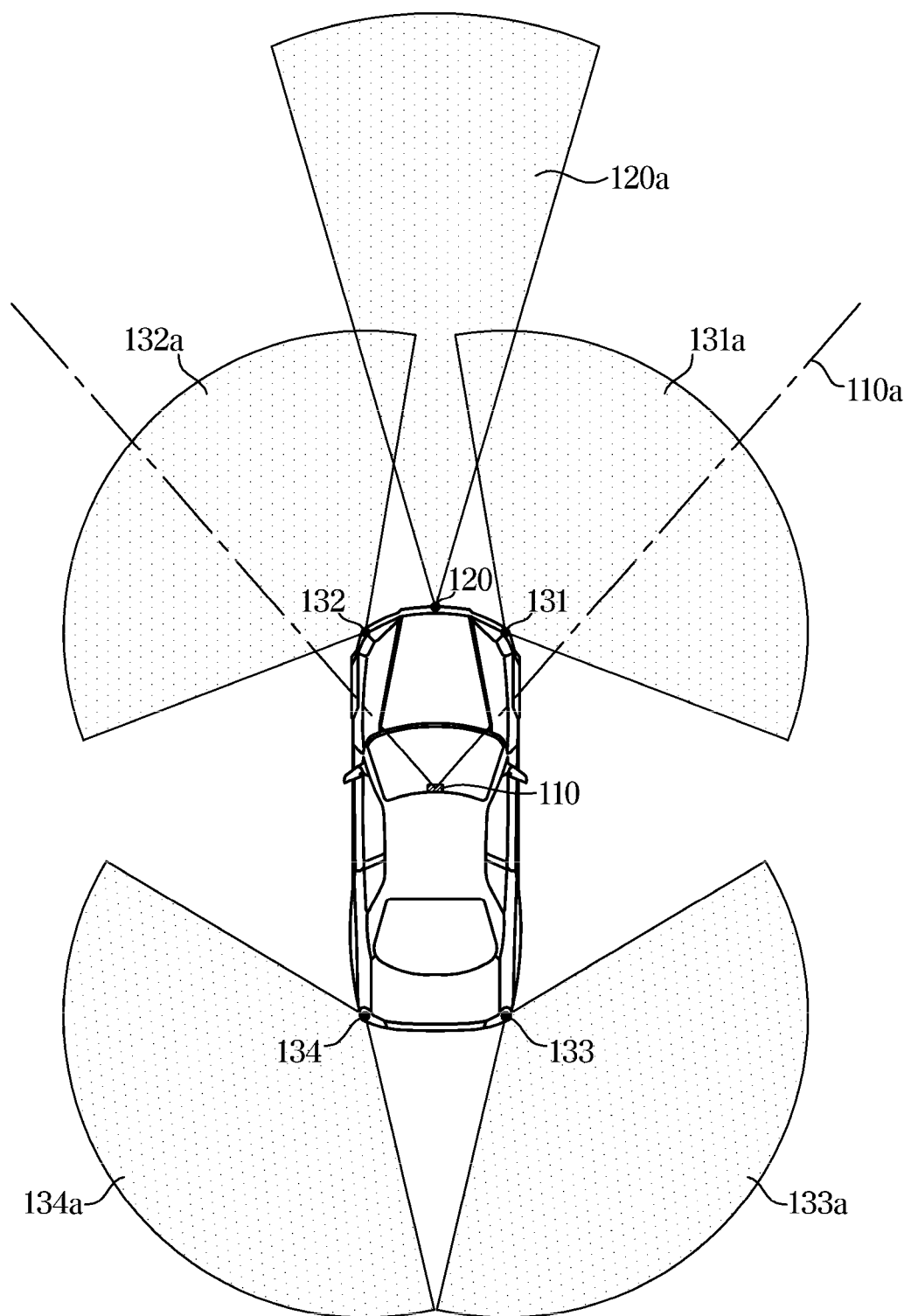
FIG. 3 is a conceptual diagram illustrating fields of view/sensing of a forward-viewing camera and a radar sensor for use in the apparatus for assisting driving of a vehicle according to an embodiment of the disclosure.

FIG. 2 is a block diagram of an apparatus for assisting driving of a vehicle according to one embodiment of the disclosure and FIG. 3 is a conceptual diagram illustrating fields of view/sensing of a forward-viewing camera and a radar sensor for use in the apparatus for assisting driving of a vehicle according to an embodiment of the disclosure.

The apparatus for assisting driving of a vehicle 100 according to an embodiment of the disclosure may include an image acquisition device that may include one or more sensors such as a forward-viewing camera mounted to the vehicle 1 and having a front field of view. The image acquisition device may additionally or alternatively include one or more alternative image sensors, such as a charge-coupled device (CCD), a CMOS image sensor, or a photo sensor including photodiodes. The apparatus for assisting driving of a vehicle 100 may further include a radar sensor 102 mounted to the vehicle 1 and configured to obtain radar data around the vehicle 1.

The forward-viewing camera 110 may be mounted at a windshield of the vehicle 1.

The forward-viewing camera 110 may capture an image of the forward region extending in front of the vehicle 1, and may acquire data of the forward-view image of the vehicle 1. The forward-view image data of the vehicle 1 may include information about the position of a peripheral vehicle, a pedestrian, a cyclist, or a lane located in the forward region extending in front of the vehicle 1.

The forward-viewing camera 110 may include a plurality of lenses and a plurality of image sensors. Each image sensor may include a plurality of photodiodes to convert light into electrical signals, and the photodiodes may be arranged in a two-dimensional (2D) matrix.

The image acquisition device, including the forward-viewing camera 110, may be electrically coupled to the processor 141 or controller 140. For example, the image acquisition device, including the forward-view camera 110, may be connected to the controller 140 through a vehicle communication network (NT), Hardwires, or a Printed Circuit Board (PCB).

The image acquisition device, including the forward-viewing camera 110, may transmit the forward-view image data of the vehicle 1 to the controller 140.

The radar sensor 102 may include a front radar 120 having a field of sensing (FOS) 120a oriented to the region forward of the vehicle 1 and a plurality of corner radars 130 having a field of sensing oriented around the vehicle 131a, 132a, 133a, 134a. The front radar 120 may be mounted to, for example, a grille or a bumper of the vehicle 1.

The front radar 120 may include a transmission (Tx) antenna (or a transmission (Tx) antenna array) to emit transmission (Tx) waves to the region forward of the vehicle 1 and a reception (Rx) antenna (or a reception (Rx) antenna array) to receive waves reflected from any object located in the FOS.

The front radar 120 may obtain front radar data not only from Tx waves received from the Tx antenna, but also from reflected waves received from the Rx antenna.

The front radar data may include not only information about a distance between the host vehicle 1 and a peripheral vehicle (or a pedestrian or cyclist or other preceding object or obstacle) located in the forward region of the host vehicle 1, but also information about a speed of the peripheral vehicle, the pedestrian, the cyclist, or the obstacle.

The front radar 120 may calculate a relative distance between the host vehicle 1 and any object or obstacle based on a difference in phase (or difference in time) between Tx waves and reflected waves, and may calculate a relative speed of the object or obstacle based on a difference in frequency between the Tx waves and the reflected waves.

For example, the front radar 120 may be coupled to the controller 140 through a vehicle communication network (NT), Hardwires, or a PCB. The front radar 120 may transmit front radar data to the controller 140.

More details about lateral direction resolution of the front radar will be described later with referring to FIGS. 4A and 4B.

The plurality of corner radars 130 may include a first corner radar 131 mounted to a forward right side of the vehicle 1, a second corner radar 132 mounted to a forward left side of the vehicle 1, a third corner radar 133 mounted to a rear right side of the vehicle 1, and a fourth corner radar 134 mounted to a rear left side of the vehicle 1. The operating principle of the plurality of corner radars 130 is the same as the operating principle with the front radar described above.

The first corner radar 131 may include a field of sensing (FOS) 131a oriented to a forward right region of the vehicle 1, as shown in FIG. 3. For example, the first corner radar 131 may be mounted to a right side of a front bumper of the vehicle 1. The second corner radar 132 may include an FOS 132a oriented to a forward left region of the vehicle 1, and may be mounted to, for example, a left side of the front bumper of the vehicle 1. The third corner radar 133 may include an FOS 133a oriented to a rear right region of the vehicle 1, and may be mounted to, for example, a right side of a rear bumper of the vehicle 1. The fourth corner radar 134 may include an FOS 134a oriented to a rear left region of the vehicle 1, and may be mounted to, for example, a left side of the rear bumper of the vehicle 1.

Each of the first, second, third, and fourth corner radars 131, 132, 133, and 134 may be connected to the controller 140 through, for example, a vehicle communication network NT, Hardwires, or a PCB. The first, second, third, and fourth corner radars 131, 132, 133, and 134 may respectively transmit first corner radar data, second corner radar data, third corner radar data, and fourth corner radar data to the controller 140.

The controller 140 may include a processor 141 and a memory 142.

The processor 141 may process forward-view image data of the forward-viewing camera 110, front radar data of the front radar 120, and corner radar data of the plurality of corner radars 130, and may generate a brake signal controlling the brake system 32 and a steering signal controlling the steering system 42. For example, the processor 141 may include an image processor to process forward-view image data of the forward-view camera 110, a digital signal processor to process radar data detected by the radars 120 and 130, and/or a Micro-Control Unit (MCU) to generate a brake signal and a steering signal.

That is, the processor 141 may be connected to at least one of the forward-viewing camera or the radar sensor 102 to detect obstacles and perform collision avoidance control of the vehicle 1. In this case, the collision avoidance control may mean controlling the vehicle 1 by generating a braking signal and a steering signal for controlling the braking system 32 and the steering system 42 of the vehicle 1.

For the above functionality, the processor 141 may include an image processor to process forward-view image data of the forward-view camera 110, a digital signal processor to process radar data detected by the radars 120 and 130, and/or a Micro-Control Unit (MCU) to generate a brake signal and a steering signal.

The processor 141 may detect obstacles (e.g., other vehicles, pedestrians, cyclists, structures, etc.) in front of the vehicle 1 based on the front image data of the forward-viewing camera 110 and/or the front radar data of the front radar 120.

In detail, the processor 141 may obtain location information (distance and direction) and speed information (relative speed) of obstacles in front of the vehicle 1 based on the front radar data of the front radar 120. The processor 141 may determine location information (direction) and type information of obstacles in front of the vehicle 1 based on the front image data of the forward-viewing camera 110 (for example, whether the obstacle is another vehicle or a pedestrian or a cyclist or whether it is a curb, a guardrail, a roadside tree, a streetlight, etc.).

In addition, the processor 141 may match the obstacles detected by the front image data with the detected obstacles by the front radar data, and obtain the type information, the position information, and the speed information of the front obstacles based on the matching result.

The processor 141 may generate a collision avoidance path for avoiding collision with the front obstacle based on the type information, the position information, and the speed information of the front obstacles.

For example, the processor 141 may recognize the first obstacle approaching in the lateral direction from the outside of the driving lane DL of the vehicle 1 and calculate a collision avoidance path for avoiding collision between the vehicle 1 and the first obstacle. In addition, the processor 141 may store the calculated collision avoidance path and the information of the first obstacle in the memory 142 and/or transmit the information to the storage 150.

In addition, if there is a possibility of collision between the vehicle 1 and the obstacle, the processor 141 may transmit a control signal for generating a warning signal and transmit the control signal to the notification unit 160.

The memory 142 may store programs and/or data needed for allowing the processor 141 to process image data, may store programs and/or data needed for the processor 141 to process radar data, and may store programs and/or data needed for the processor 141 to generate a brake signal and/or a steering signal or perform other functions described herein.

The memory 142 may temporarily store image data received from the forward-viewing camera 110 and/or radar data received from the radars 120 and 130, and process the image data and/or radar data of the processor 141. The memory 142 may also temporarily store processed image data and processed radar data. For example, the memory 142 may temporarily store information of a first obstacle approaching in the lateral direction from the outside of the driving lane DL of the vehicle 1 and a collision avoidance path for avoiding a collision with the first obstacle.

The memory 142 may be a non-transitory memory and may include not only a volatile memory, such as a Static Random Access memory (SRAM) or a Dynamic Random Access Memory (DRAM), but also a non-volatile memory, such as a flash memory, a Read Only Memory (ROM), or an Erasable Programmable Read Only Memory (EPROM), or the like.

The storage 150 may receive and store information about the collision avoidance path and the first obstacle, such as the collision avoidance path calculated to avoid collision with the first obstacle by the processor 141.

The collision avoidance path may specifically refer to a control plan for performing collision avoidance control of the vehicle 1, and may include both a steering control amount and timing information therefor and a braking control amount and timing information therefor for collision avoidance of the vehicle 1.

Such storage 150 may be implemented using at least one of nonvolatile memory devices such as cache, read only memory (ROM), programmable ROM (PROM), erasable programmable ROM (EPROM), electrically erasable programmable ROM (EEPROM), and flash memory, or random access memory (RAM) or a volatile memory device such as a memory, a storage medium such as a hard disk drive (HDD), a CD-ROM, but is not limited thereto.

The storage 150 may be a memory implemented as a separate chip from the processor 141 described above with respect to the controller, or may be implemented as a single chip with the processor 141.

The notification unit 160 may output a warning signal to the user in response to the control signal of the controller. The notification unit 160 for this purpose, may include the sound output unit 161 including a speaker for outputting a warning sound for preventing collision with the obstacle in accordance with the control signal of the controller and the display 162 for outputting a warning image for preventing collision with the obstacle in accordance with the control signal of the controller.

The radar sensor 102 will be described in more detail below with reference to FIGS. 4A and 4B. FIGS. 4A and 4B illustrate lateral angle resolution of a front radar according to one embodiment of the disclosure.

The front radar 120 and the first and second corner radars 131 and 132 may be low-cost radars that are less expensive than the Lidar sensors and may be radars of the model MRR-20, the model LRR-20, or the model LRR-30.

The front radar 120 and the first and second corner radars 131 and 132 may be radars of the same model or radars of different models.

In addition, the front radar 120 may be a radar having a higher lateral angle resolution than the first and second corner radars 131 and 132.

Figure 4A:
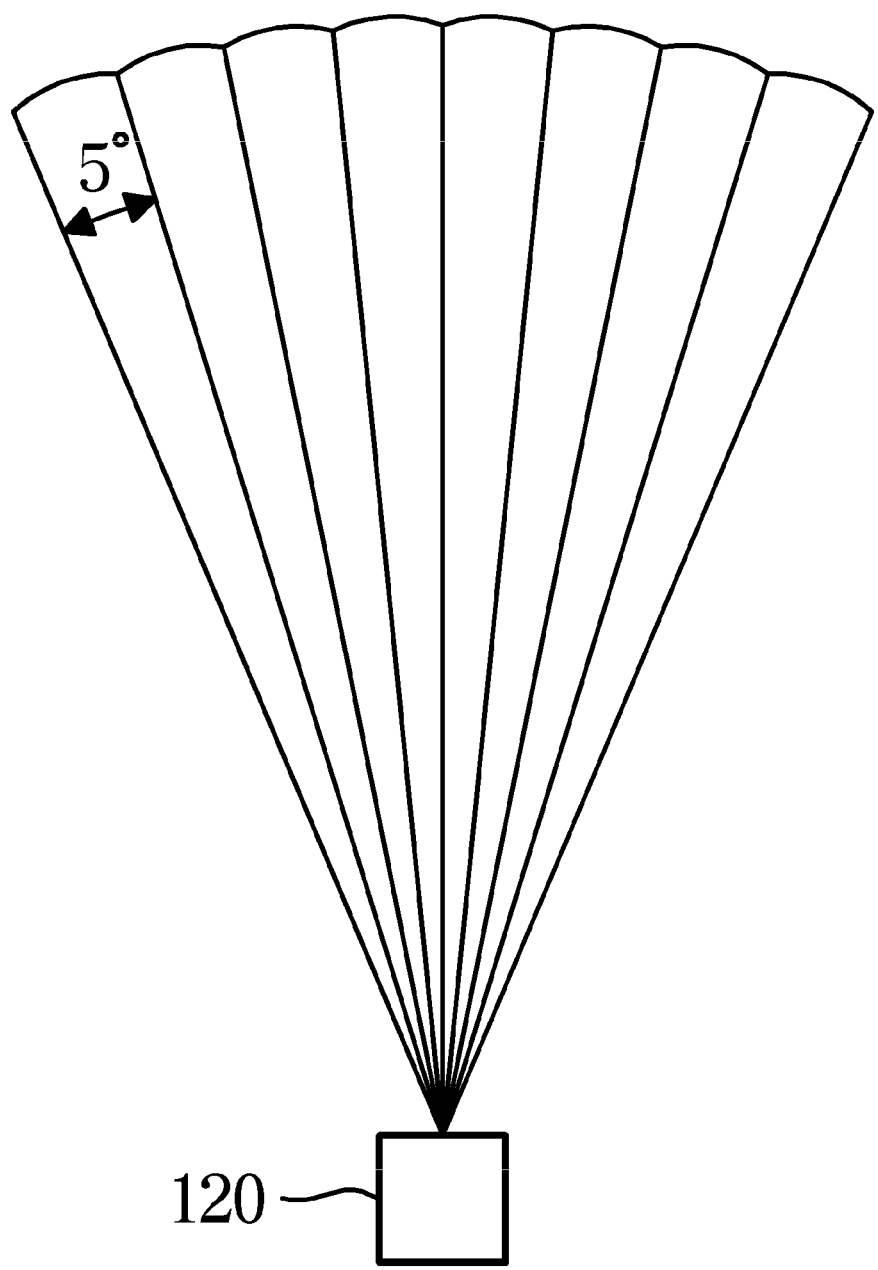
FIGS. 4A and 4B illustrate lateral angle resolution of a front radar according to one embodiment of the disclosure.

As shown in FIG. 4A, when the front radar 120 included in the radar sensor 102 is a radar of the model LRR-20, the front radar 120 has eight receiving channels each having a lateral angle resolution of 5 degrees or less. The position of the obstacle present at a distance of 200 m or more can be detected through the channels. That is, the front radar 120 may detect the correct direction of the obstacle through the eight receiving channels.

In addition, when the front radar 120 is a radar of the model LRR-30, the front radar 120 may have a lateral angle resolution of 2.5 degrees or less.

Figure 4B:
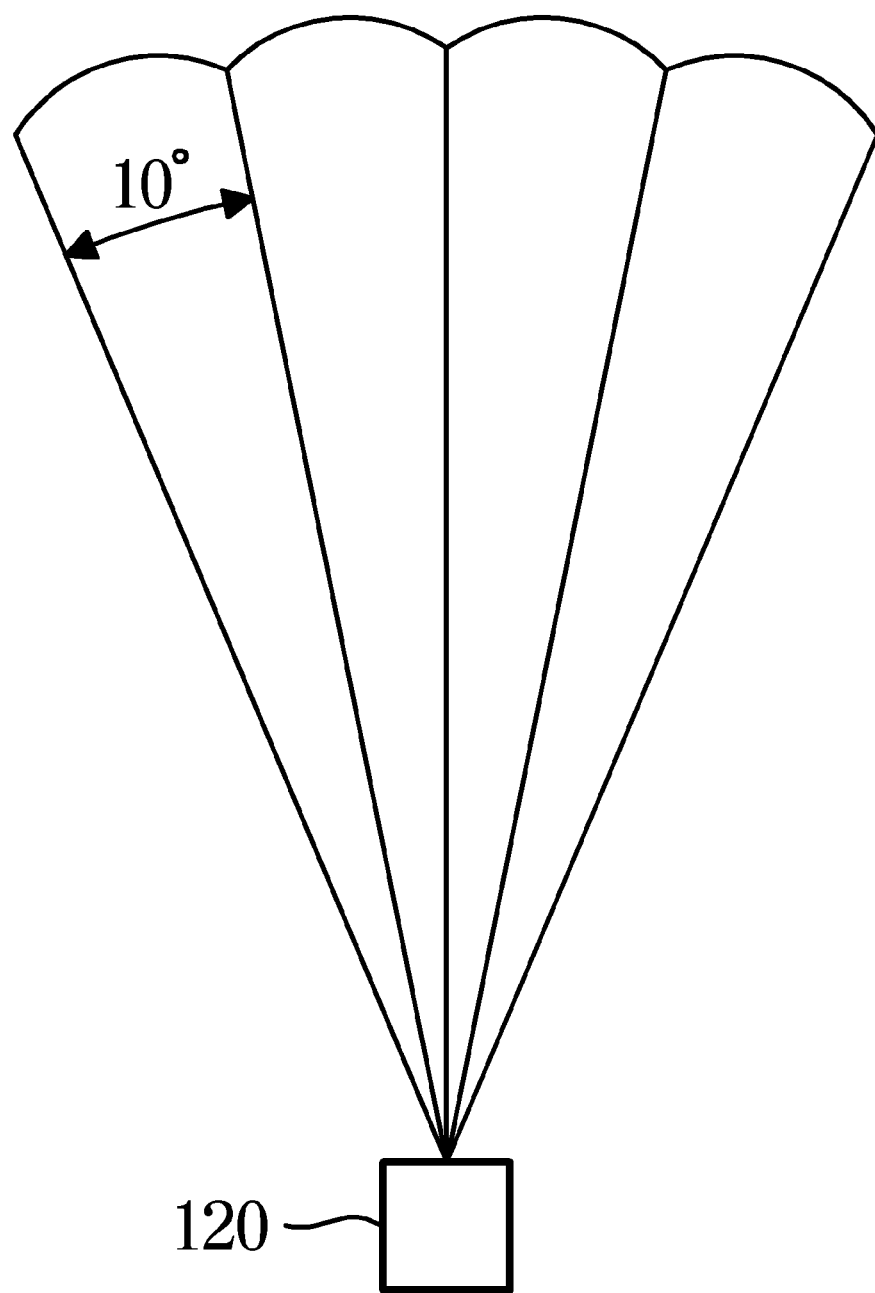

As shown in FIG. 4B, when the front radar 120 is a radar of the model MRR-20, the front radar 120 has four receiving channels each having a lateral angle resolution of 10 degrees or less. The location of the existing obstacle can be detected, for example at a distance of about 160 m.

The radar sensor 102 for controlling the brake system 32 and the steering system 42 to prevent collisions with obstacles may include only the front radar 120. In this case, the front radar 120 may have a plurality of receiving channels, and output position information of the obstacle corresponding to the detection signal of the obstacle received through at least one of the plurality of receiving channels.

The plurality of receiving channels herein may receive radio waves reflected by obstacles in respective regions divided at pre-determined angles with the center of the front of the vehicle 1 as a center point.

That is, the front radar 120 may detect the direction of the obstacle through a reception channel in which an obstacle is detected among a plurality of reception channels having a pre-determined angle resolution.

The radar sensor 102 according to an embodiment may be replaced or combined with a LiDAR (Light Detection and Ranging) sensor, wherein a LiDAR sensor is a non-contact distance detection sensor using a laser radar principle.

Hereinafter, a collision avoidance control process using each component of the apparatus for assisting driving of a vehicle 100 will be described with reference to FIGS. 5A, 5B, and 6 through 11.

Figure 5A:
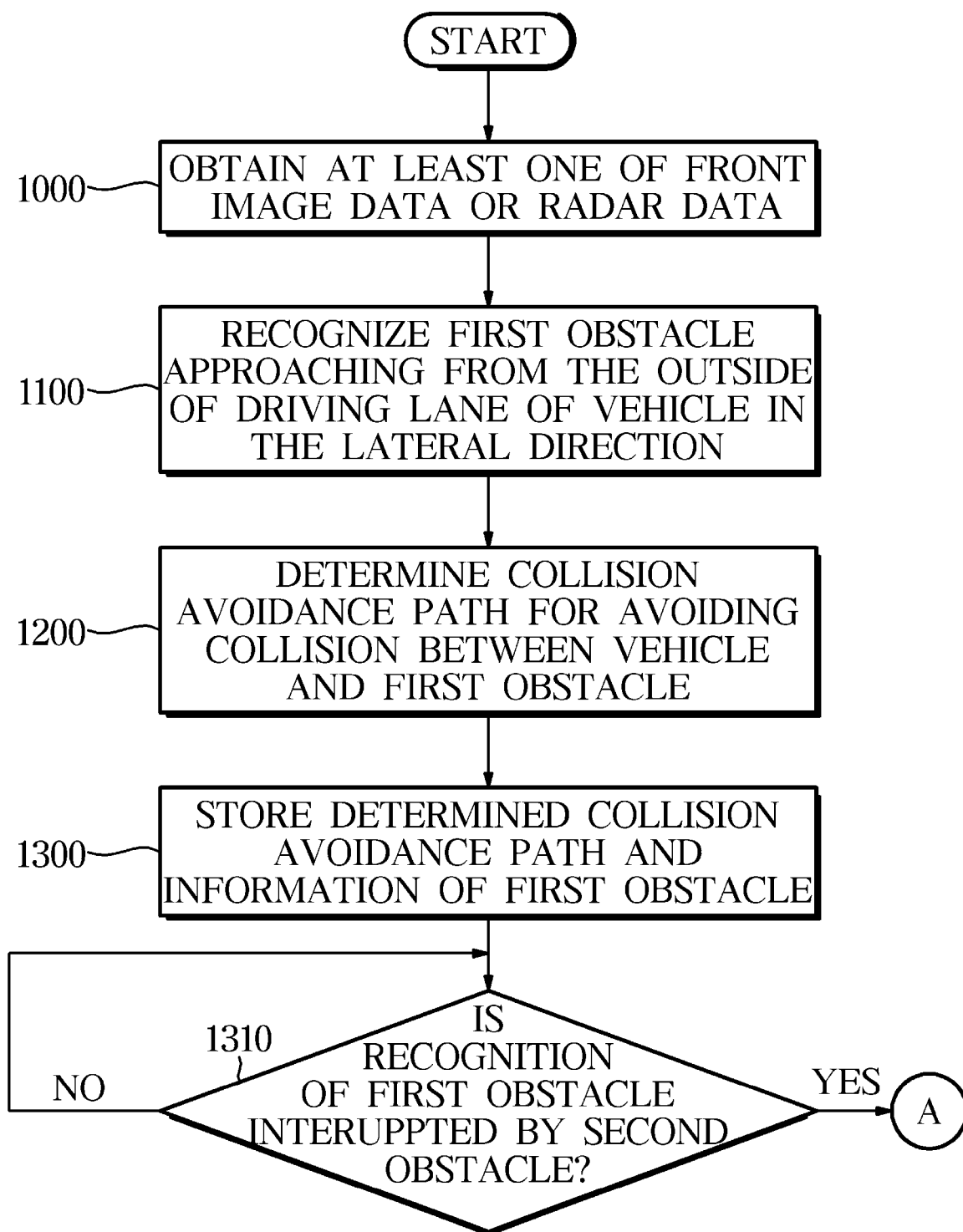
FIGS. 5A and 5B show a flow chart of a method for assisting driving of a vehicle according to one embodiment of the disclosure.
Figure 5B:
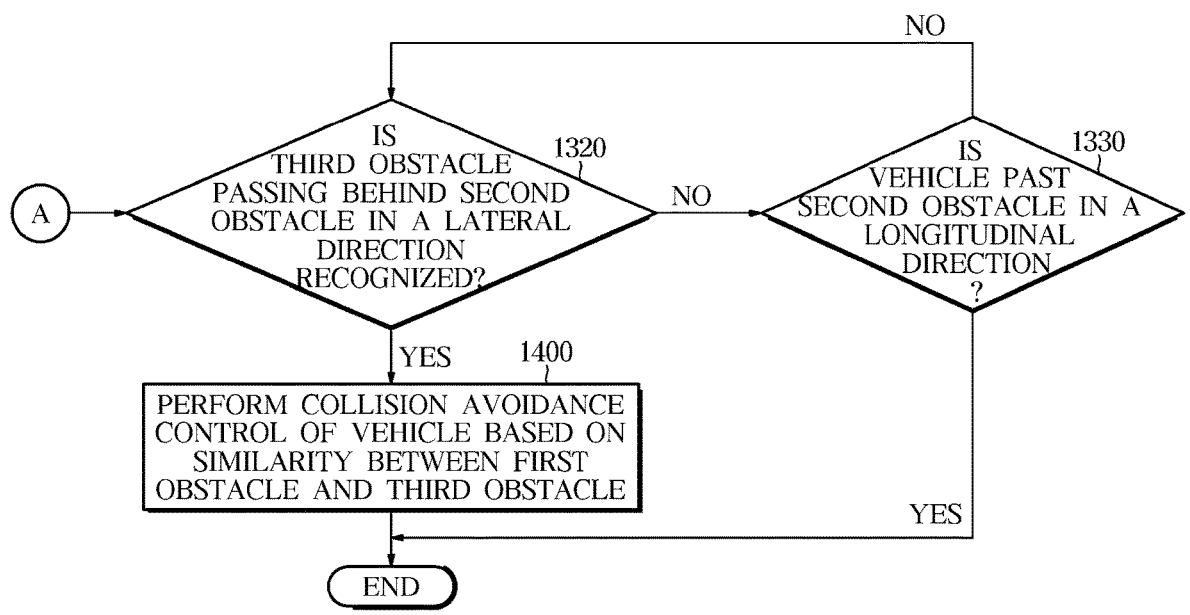

FIGS. 5A and 5B are flow charts of a method for assisting driving of a vehicle according to one embodiment of the disclosure. FIGS. 5A and 5B will be described with reference to FIGS. 6 to 11.

Referring to FIG. 5A, a forward-viewing camera 110 may acquire forward image data of the vehicle 1, and the radar sensor 102 may obtain radar data around the vehicle 1. The controller 140 may receive at least one of front image data of the vehicle 1 or radar data around the vehicle 1 (1000).

The controller 140 may recognize the first obstacle ob1 laterally approaching the driving lane from the outside of the driving lane of the vehicle DL based on at least one of the received image data in front of the vehicle 1 or radar data around the vehicle 1 (1100). In this case, the first obstacle ob1 may correspond to a pedestrian, a cyclist, or another vehicle moving in the lateral direction.

In detail, the controller 140 may recognize an obstacle having a lateral speed greater than a pre-determined speed (e.g., a minimum lateral speed threshold) among the obstacles detected in at least one of the image data and the radar data, as the first obstacle ob1. For example, the controller 140 may recognize as the first obstacle ob1 an obstacle having a lateral speed of 1 m/s or more. This is because collision is unlikely with an obstacle having a lateral speed smaller than the pre-determined speed.

In addition, the controller 140 may recognize as the first obstacle ob1 an obstacle having an estimated time of arrival (ETA) to the driving lane DL on which the vehicle 1 is driving that is less than a pre-determined ETA-threshold time. For example, the controller 140 may recognize an obstacle having an ETA to the driving lane DL within (e.g., less than or equal to) 5 seconds as the first obstacle ob1. This is because the probability or possibility of collision with an obstacle having a lateral speed greater than pre-determined speed is relatively low when the obstacle has a long estimated time of arrival to the driving lane DL.

Also, the controller 140 may determine the time to collision (TTC) between the detected obstacles and the vehicle 1 based on the longitudinal speed of the vehicle 1 and the obstacle detected in at least one of the image data or the radar data, and may recognize as the first obstacle ob1 an obstacle having a TTC with the vehicle 1 that is less than a pre-determined TTC-threshold time. For example, the controller 140 may recognize as the first obstacle ob1 an obstacle having a TTC with the vehicle 1 within (e.g., less than or equal to) 5 seconds. This is because the probability or possibility of collision with an obstacle having a long estimated collision time with the vehicle 1 is relatively low. The TTC-threshold may be the same as or different from the ETA-threshold.

In order to recognize the first obstacle ob1 that is moving in the lateral direction and is likely to collide with the vehicle 1 accurately and rationally, the controller 140 may perform pre-selection among obstacles detected in at least one of the image data or the radar data. In one embodiment, only obstacles having a lateral speed greater than the pre-determined speed, having an ETA to the driving lane DL being less than the pre-determined ETA-threshold time, and having a TTC with the vehicle 1 being less than the pre-determined TTC-threshold time are recognized as the first obstacle ob1. The stability of the overall collision avoidance control can be achieved by recognizing the first obstacle ob1 which has a high probability of collision with the vehicle 1.

Figure 6:
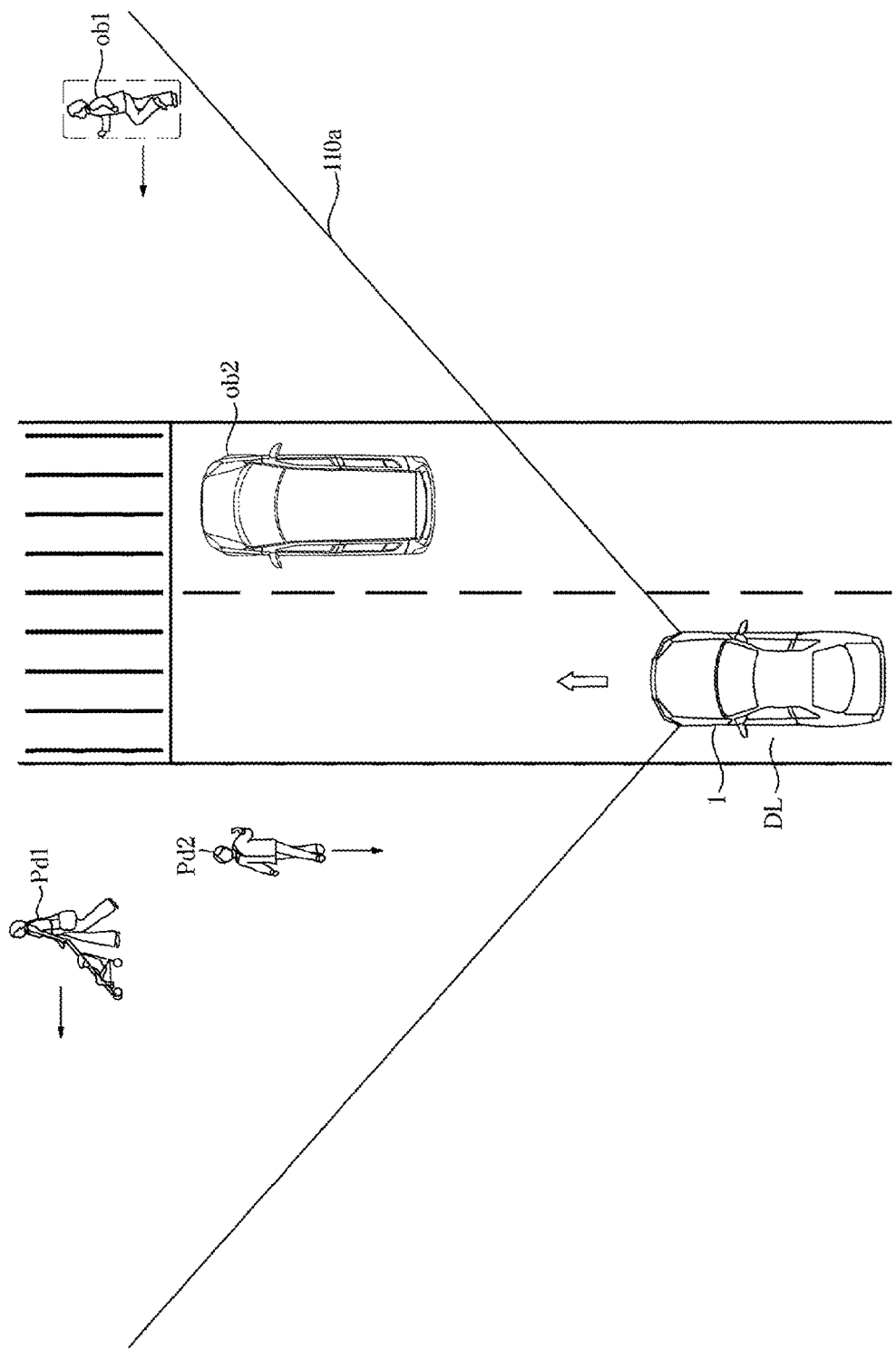
FIG. 6 illustrates a situation in which an apparatus for assisting driving of a vehicle recognizes a first obstacle.

As shown in FIG. 6, the controller 140 may recognize the obstacle ob1, having a lateral speed greater than the pre-determined speeds, having an ETA to the driving lane of the vehicle DL less than the pre-determined ETA-threshold time, and having a TTC with the vehicle 1 less than the pre-determined TTC-threshold time, among the obstacles pd1, pd2, ob1, and ob2 detected in at least one of the image data and the radar data, Thereafter, the controller 140 may determine a collision avoidance path for avoiding collision between the vehicle 1 and the first obstacle ob1 (1200), and store the determined collision avoidance path and the information of the first obstacle ob1 (1300). At this time, the collision avoidance path may include a control plan for performing collision avoidance control of the vehicle 1. In addition, the information of the first obstacle ob1 may include at least one of lateral speed, area (or size), or color of the first obstacle ob1.

The controller 140 may store the collision avoidance path and the information of the first obstacle ob1 in the memory 142 or transmit the information to the storage 150.

In general, when the collision between the first obstacle ob1 and the vehicle 1 is expected, the controller 140 may perform collision avoidance control based on the stored collision avoidance path. However, if the visibility between the vehicle 1 and the first obstacle ob1 is secured, the collision between the vehicle 1 and the first obstacle ob1 would not be expected since the first obstacle ob1 such as a pedestrian would stop moving in the lateral direction.

Figure 7:
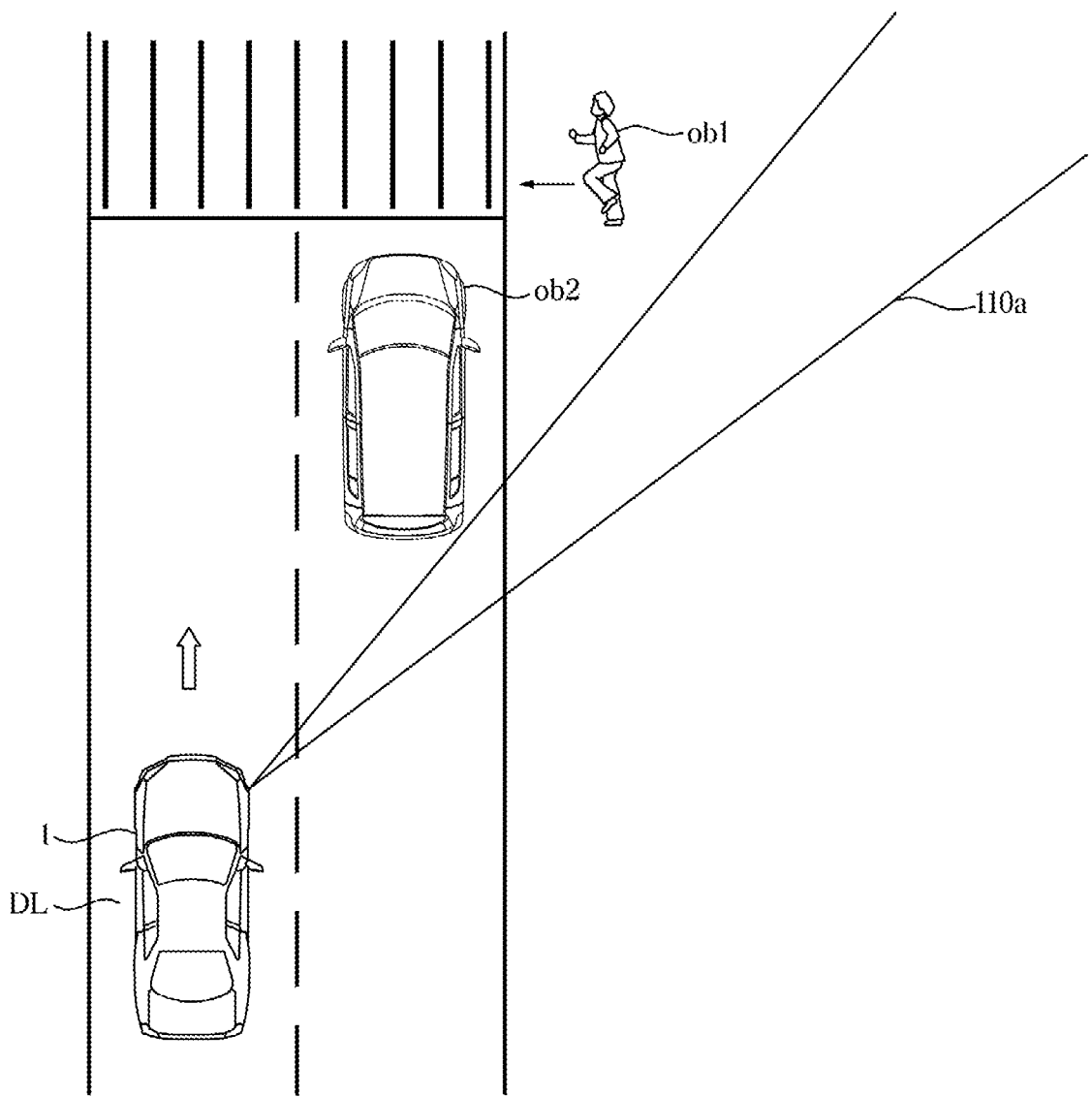
FIG. 7 illustrates a situation in which the recognition of a first obstacle is interrupted.

However, as shown in FIG. 7, when there is the second obstacle ob2 located between the first obstacle ob1 and the vehicle 1 to obstruct the view, the vehicle 1 may not secure or maintain a view of the first obstacle ob1, and the first obstacle ob1 may also fail to secure or maintain a view of the vehicle 1. As such, the risk of collision may be increased. In this case, the second obstacle ob2 may refer to any object that can obstruct the view of the vehicle 1, such as another vehicle parked on a shoulder, a structure, a roadside tree, a wall, and the like.

Specifically, the forward-viewing camera 110 mounted to the vehicle 1 as well as the driver in the vehicle 1 may obtain image data in which the first obstacle ob1 is obstructed by the second obstacle ob2. Similarly, the radar sensor 102 mounted to the vehicle 1 may only obtain radar data reflected from the second obstacle ob2, but may thus not obtain radar data reflected from the first obstacle ob1.

In the situation described in FIG. 7, the collision avoidance system of a vehicle that is not equipped with the capabilities described herein may no longer recognize, view, or track the first obstacle ob1 while it is obstructed by the second obstacle ob2, and the collision avoidance system's recognition of the first obstacle ob1 may thus only be re-activated when the first obstacle ob1 finishes passing behind the second obstacle ob2 in the lateral direction and emerges or re-enters the vehicle's field of view. As a result, the activation timing of the collision avoidance system may be late and inaccurate.

However, as will be described later, according to the disclosure, the controller 140 may store the collision avoidance path for the first obstacle ob1 in the memory 142 or may transmit and store the collision avoidance path to the storage 150 so that the controller 140 may perform collision avoidance control of the vehicle 1 quickly and accurately when the first obstacle ob1 re-appears in or re-enters the field of view of the vehicle 1 after passing behind the second obstacle ob2 as it continues moving in the lateral direction.

In addition, the controller 140 may store the information of the first obstacle ob1 in the memory 142, or may transmit and store the information of the first obstacle ob1 to the storage 150. The controller 140 may secure the reliability of performing collision avoidance control by comparing the information of the first obstacle ob1 and the information of a third obstacle ob3.

According to an embodiment of the controller 140, after the recognition, sensing, or monitoring of the first obstacle ob1 is interrupted or obstructed by the second obstacle ob2 located between the first obstacle ob1 and the vehicle 1 (YES in 1310), when the third obstacle ob3 passing behind the second obstacle ob2 in the lateral direction is identified or recognized (YES in 1320), the controller 140 may perform collision avoidance control of the vehicle based on the collision avoidance path stored in the storage 150 and/or memory 142 based on determining the similarity between the first obstacle ob1 and the third obstacle ob3 (1400).

In these regards, the newly recognized third obstacle ob3 may be the same obstacle as the first obstacle ob1 or may be a different obstacle. In general, the distinction between the first obstacle ob1 and the third obstacle ob3 is based on a point of time when the radar sensor 102 and/or the forward-viewing camera 110 detects the obstacle: an obstacle identified at step 1100 may be referenced as the first obstacle ob1 while a same or different obstacle identified at step 1320 may be referenced as a third obstacle ob3 even though the obstacles may be the same as or different from each other.

In addition, the controller 140, after the recognition of the first obstacle ob1 is interrupted by the second obstacle ob2 located between the first obstacle ob1 and the vehicle 1 (1310), may not perform the collision avoidance control based on the stored collision avoidance path and may end the process (NO in 1320) if the third obstacle ob3 is not recognized before the vehicle 1 passes the second obstacle ob2 in the longitudinal direction (YES in 1330). That is because if the third obstacle ob3 is not recognized before the vehicle 1 passes the second obstacle ob2 in the longitudinal direction, there is no need to perform the collision avoidance control based on the stored collision avoidance path since there is no obstacle matching the first obstacle ob1 that may be collided with the vehicle 1.

That is, the controller 140 may only perform the collision avoidance control based on the stored collision avoidance path if the third obstacle ob3 is recognized prior to the vehicle 1 passing the second obstacle ob2 in the longitudinal direction. In this respect, when it is determined that the driver's seat portion of the vehicle 1 completely passes the second obstacle ob2, the controller 140 may determine that the vehicle 1 has passed the second obstacle ob2 in the longitudinal direction.

Figure 8:
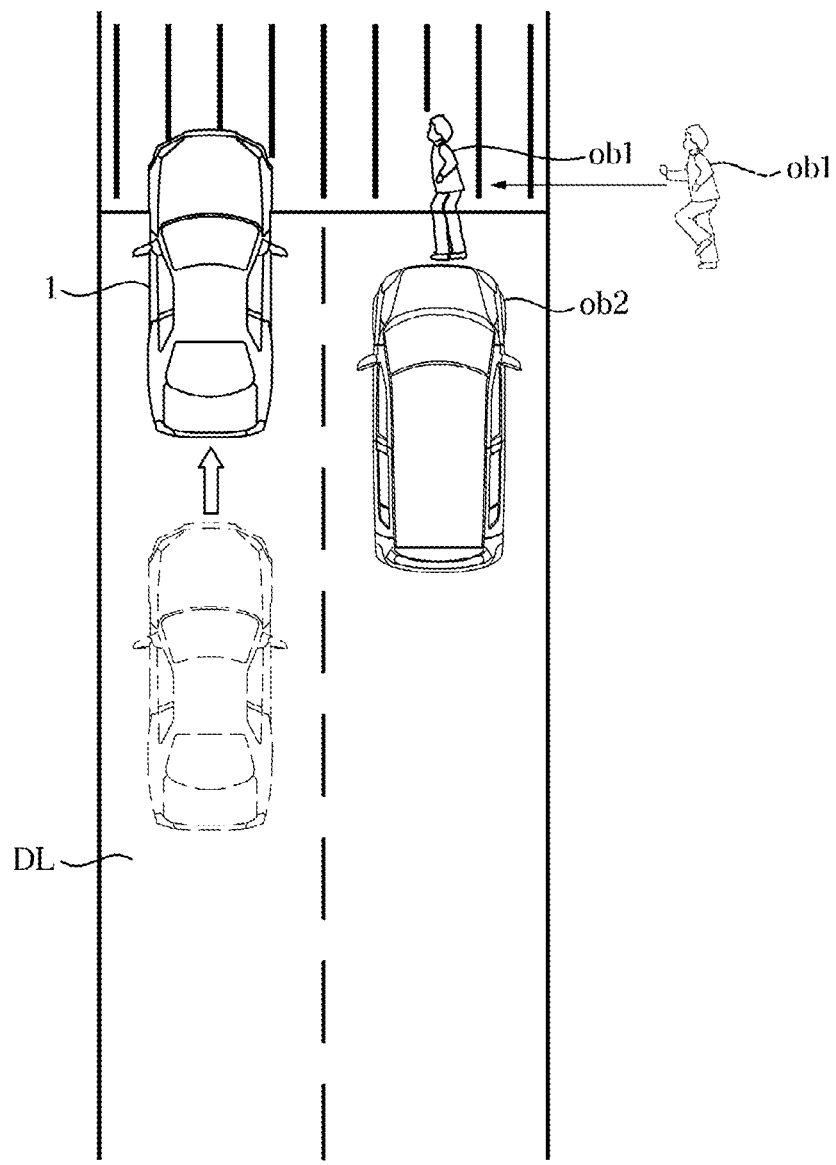
FIG. 8 illustrates a situation in which a third obstacle is not recognized after the recognition of a first obstacle is interrupted

For example as shown in FIG. 8, if the third obstacle ob3 is not recognized by the controller 140 when the vehicle 1 passes the second obstacle ob2 in the longitudinal direction, the controller 140 may determine that the first obstacle ob1 did not pass behind the second obstacle ob2 to re-emerge in the vehicle's lane and may not perform the collision avoidance control based on the stored collision avoidance path.

When the third obstacle ob3 is recognized by the controller 140 (YES in 1320), the controller 140 may compare the information of the first obstacle ob1 stored in the storage 150 and/or the memory 142 and the information of the recognized third obstacle ob3 and may determine a similarity between the first obstacle ob1 and the third obstacle ob3 by comparing the information of the two obstacles ob1 and ob3.

For example, the controller 140 may compare at least one of the lateral speed, the area (or size), or the color of each of the first obstacle ob1 and the third obstacle ob3 to determine the similarity between the first obstacle ob1 and the third obstacle ob3. In this case, the third obstacle ob3 may refer to all obstacles recognized behind the second obstacle ob2 and may mean all moving objects such as pedestrians and cyclists.

A method of determining the similarity based on the radar data obtained by the radar sensor 102 may include determining the lateral direction speed of each obstacle based on the frequency difference of the radio waves reflected from each obstacle, and comparing of the lateral direction speeds of the obstacles to calculate the similarity. In addition, there is a method of comparing the area of each obstacle and calculating similarity based on the reflectance of the radio waves reflected from each obstacle, but is not limited thereto.

As described with reference to FIGS. 4A to 4B, the apparatus for assisting driving of a vehicle 100 according to the exemplary embodiment includes a radar sensor 102 having improved lateral direction resolution, thereby enabling to refine the reflectance to accurately calculate the area of each obstacle.

A method of calculating similarity based on forward image data obtained by the forward-viewing camera 110 may include a method of comparing the lateral speed of each obstacle, a method of comparing the area of each obstacle based on the size of each obstacle in the image data, and a method of comparing appearance of each obstacles such as color, but is not limited thereto.

Figure 9:
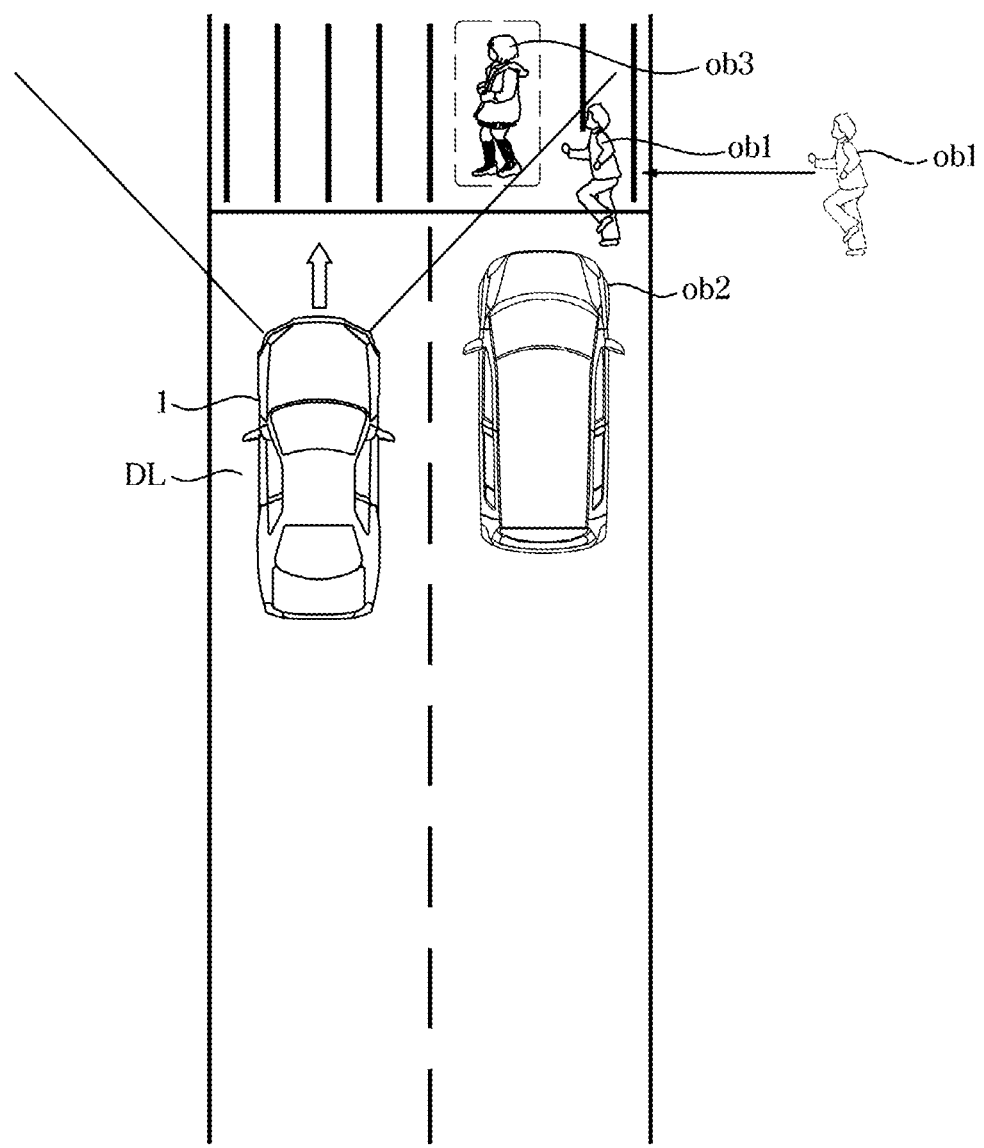
FIG. 9 and FIG. 10 illustrate situations in which a similarity between a first obstacle and a third obstacle is relatively low.

As shown in FIG. 9, when the third obstacle ob3 is recognized by the controller 140 after the recognition of the first obstacle ob1 is interrupted, the controller 140 may determine the similarity between the first obstacle ob1 and the third obstacle ob3 and may perform the collision avoidance control based on the stored collision avoidance path depending on the determined similarity.

For example, the controller 140 may perform collision avoidance control based on full-braking in accordance with the stored collision avoidance path when the similarity between the first obstacle ob1 and the third obstacle ob3 is greater than a first threshold value. Full-braking may mean braking the vehicle 1 with a braking amount of 80% or more of the maximum braking amount of the braking device 30.

The controller 140 may perform collision avoidance control based on partial-braking in accordance with the stored collision avoidance path when the similarity between the first obstacle ob1 and the third obstacle ob3 is less than the first threshold value and greater than a second threshold value wherein the second threshold value is smaller than the first threshold value. Partial-braking may mean braking the vehicle 1 with a braking amount of less than 80% of the maximum braking amount of the braking device 30.

In addition, the controller 140 may transmit a control signal for generating a warning signal to the notification unit 160 in accordance with the stored collision avoidance path when the similarity between the first obstacle ob1 and the third obstacle ob3 is greater than third threshold value, which is smaller than the second threshold value. That is, when the similarity is greater than the third threshold value, the collision can be prevented by notifying the driver of the risk of collision.

Referring to FIG. 9, it may be confirmed that the first obstacle ob1 and the third obstacle ob3 are different kinds of obstacles. That is, the first obstacle ob1 is shown as a male pedestrian and the third obstacle ob3 is shown as a female pedestrian. For male pedestrians and female pedestrians, the area (or size) will be different, and if they are dressed differently, the color will be different. That is, the controller 140 may determine the similarity between the male pedestrian and the female pedestrian below the first threshold value unless there is a special situation.

For example, if the lateral direction speed of the female pedestrian (e.g., ob3) is similar to the stored lateral direction speed of the male pedestrian (e.g., ob1), the similarity may be calculated above the first threshold.

In this case, the controller 140 may perform collision avoidance control with full-braking based on the collision avoidance path stored in the storage 150 and/or the memory 142.

In other words, if the similarity is high even if the types of obstacles are different, fast and accurate collision avoidance control can be performed by utilizing a collision avoidance path stored in advance.

Figure 10:
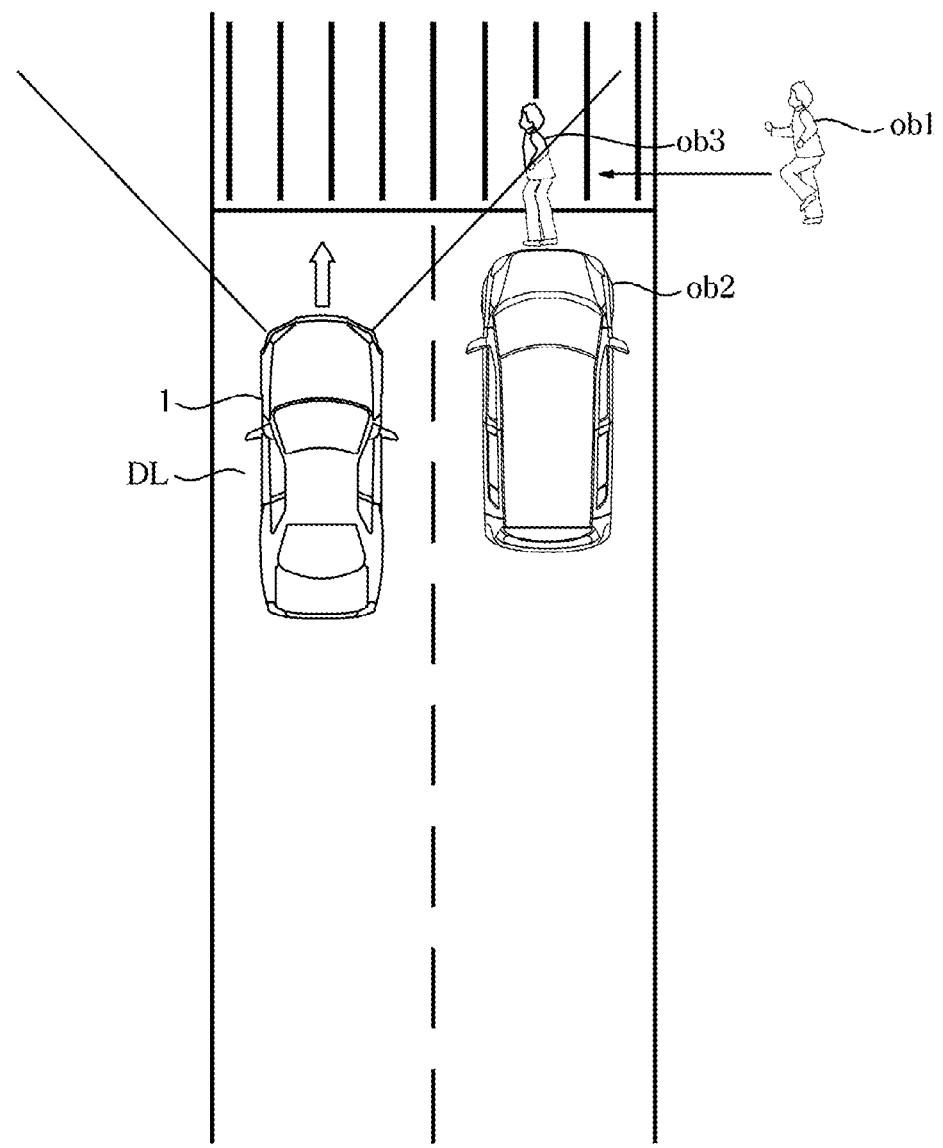

Referring to FIG. 10, it may be confirmed that the first obstacle ob1 and the third obstacle ob3 are the same kind of obstacles. That is, the first obstacle ob1 is the male pedestrian sensed before being obstructed from view of the vehicle 1 by the second obstacle ob2, and the third obstacle ob3 is the same male pedestrian sensed after the visibility thereof is secured after emerging from behind the second obstacle ob2.

FIG. 10 illustrates a situation in which a male pedestrian recognizes the presence of the vehicle 1 and reduces his lateral speed not to completely pass the second obstacle ob2.

In this case, although the first obstacle ob1 and the third obstacle ob3 are the same male pedestrian, the area is different because the male pedestrian is obscured by the second obstacle ob2 partially and is only partially exposed to field of view of the vehicle 1, and the lateral speed of the pedestrian is also different. Thus, the controller 140 may determine that the similarity between the first obstacle ob1 and the third obstacle ob3 is relatively low.

Figure 11:
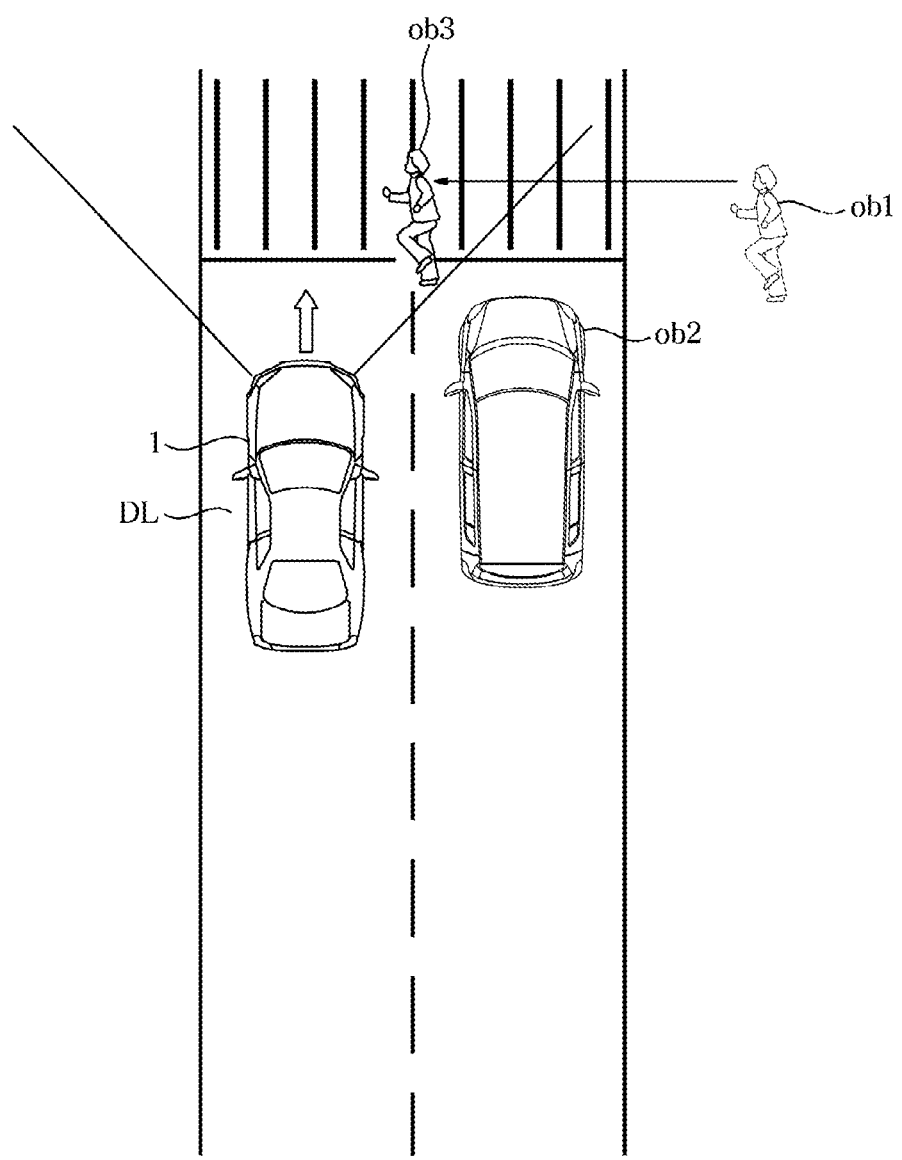
FIG. 11 illustrate a situation in which a similarity between a first obstacle and a third obstacle is relatively high.

Referring to FIG. 11, as in FIG. 10, it may be confirmed that the first obstacle ob1 and the third obstacle ob3 are the same kind of obstacles, wherein the first obstacle is the male pedestrian sensed before being obstructed from the view of the vehicle 1 by the second obstacle ob2, and the third obstacle ob3 is the same male pedestrian sensed after the view thereof is secured after emerging from behind the second obstacle ob2.

However, unlike FIG. 10, FIG. 11 shows a state where the male pedestrian completely passes the second obstacle ob2 without recognizing the existence of the vehicle 1 and without decreasing the lateral speed.

In this case, the controller 140 may determine that the similarity between the first obstacle ob1 and the third obstacle ob3 is equal to the first threshold value or more, and the controller 140 may perform the collision avoidance control based on the collision avoidance path stored in the storage 150 and/or the memory 142 with full-braking of the vehicle 1.

The above-mentioned embodiments may be implemented in the form of a recording medium storing commands capable of being executed by a computer system. The commands may be stored in the form of program code on a non-transitory recording medium. When the commands are executed by the processor 141, a program module is generated by the commands so that the operations of the disclosed embodiments may be carried out by the driver assistance system. The recording medium may be implemented as a computer-readable recording medium.

The computer-readable recording medium includes all kinds of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

Although a few embodiments of the present disclosure have been shown and described, it would be appreciated by those skilled in the art that changes may be made in these embodiments without departing from the principles and spirit of the disclosure, the scope of which is defined in the claims and their equivalents.

According to an exemplary embodiment of the apparatus for assisting driving of a vehicle 100 and the method thereof, the vehicle may perform appropriate collision avoidance control when a pedestrian obstructed by another vehicle parked on a shoulder or a structure suddenly appears in the field of view of the vehicle.

Also, the vehicle may prevent unnecessary collision avoidance control to secure the reliability of the collision avoidance control system by determining the similarity of pedestrians and performing different control for each similarity.

What is claimed is:

1. An apparatus for assisting driving of a vehicle comprising:
an image acquisition device mounted to a vehicle and having a field of view extending in front of the vehicle to obtain image data;
a radar sensor mounted to the vehicle to obtain radar data around the vehicle; and
a controller comprising at least one processor and communicatively connected to at least one of the image acquisition device or the radar sensor to detect obstacles and perform collision avoidance control of the vehicle and configured to:
recognize a first obstacle approaching in a lateral direction from an outside of a driving lane of the vehicle based on at least one of the image data or the radar data;
generate a collision avoidance path for avoiding collision between the vehicle and the first obstacle;
store the generated collision avoidance path and information of the first obstacle;
recognize a third obstacle that passes behind a second obstacle located between the first obstacle and the vehicle in the lateral direction after the recognition of the first obstacle is interrupted by the second obstacle; and
perform collision avoidance control of the vehicle based on a similarity between the first obstacle and the third obstacle and based on the stored collision avoidance path,
wherein the controller is configured to perform the collision avoidance control with partial-braking of the vehicle if the similarity between the first obstacle and the third obstacle is determined to be less than a first threshold value and greater than a second threshold value, the second threshold value being smaller than the first threshold value.

2. The apparatus for assisting driving of a vehicle according to claim 1, wherein the controller is further configured to recognize as the first obstacle an obstacle having a lateral speed greater than a pre-determined speed.

3. The apparatus for assisting driving of a vehicle according to claim 1, wherein the controller is further configured to recognize as the first obstacle an obstacle having an estimated time of arrival to the driving lane of the vehicle less than a pre-determined time.

4. The apparatus for assisting driving of a vehicle according to claim 1, wherein the controller is further configured to:
  determine a Time to Collision (TTC) between the detected obstacles and the vehicle based on a longitudinal speed of the vehicle; and
  recognize an obstacle having a TTC less than a pre-determined time as the first obstacle.

5. The apparatus for assisting driving of a vehicle according to claim 1, wherein the controller only performs the collision avoidance control based on the stored collision avoidance path if the third obstacle is recognized and the vehicle passes the second obstacle in the longitudinal direction.

6. The apparatus for assisting driving of a vehicle according to claim 1, wherein the controller is configured to determine the similarity between the first obstacle and the third obstacle by comparing the stored information of the first obstacle with information of the recognized third obstacle, and
  the controller is configured to determine the similarity between the first obstacle and the third obstacle by comparing at least one of a lateral speed, an area, or a color of each of the first obstacle and the third obstacle.

7. The apparatus for assisting driving of a vehicle according to claim 1, wherein the controller is configured to perform the collision avoidance control with full-braking of the vehicle if the similarity between the first obstacle and the third obstacle is determined to be greater than the first threshold value.

8. A method for assisting driving of a vehicle comprising:
  recognizing a first obstacle approaching in a lateral direction from an outside of a driving lane of a vehicle based on at least one of image data obtained from an image acquisition device mounted to the vehicle or radar data obtained from a radar sensor mounted to the vehicle;
  generating a collision avoidance path for avoiding collision between the vehicle and the first obstacle;
  storing the generated collision avoidance path and information of the first obstacle;
  recognizing a third obstacle that passes behind a second obstacle located between the first obstacle and the vehicle in the lateral direction after the recognition of the first obstacle is interrupted by the second obstacle; and
  performing collision avoidance control of the vehicle based on a similarity between the first obstacle and the third obstacle and based on the stored collision avoidance path,
  wherein the performing of collision avoidance control of the vehicle based on the similarity between the first obstacle and the third obstacle comprises:
  performing the collision avoidance control with partial-braking of the vehicle if the similarity between the first obstacle and the third obstacle is determined to be less than a first threshold value and greater than a second threshold value, the second threshold value being smaller than the first threshold value.

9. The method for assisting driving of a vehicle according to claim 8, wherein the recognizing of the first obstacle comprises recognizing as the first obstacle an obstacle having a lateral speed greater than a pre-determined speed.

10. The method for assisting driving of a vehicle according to claim 8, wherein the recognizing of the first obstacle comprises recognizing as the first obstacle an obstacle having an estimated time of arrival to the driving lane of the vehicle less than a pre-determined time.

11. The method for assisting driving of a vehicle according to claim 8, wherein the recognizing of the first obstacle comprises:
  determining a Time to Collision (TTC) between obstacles detected from the image data or the radar data and the vehicle based on a longitudinal speed of the vehicle; and
  recognizing an obstacle having a TTC less than a pre-determined time as the first obstacle.

12. The method for assisting driving of a vehicle according to claim 8, wherein the collision avoidance control based on the stored collision avoidance path is performed only if the third obstacle is recognized and the vehicle has not passed the second obstacle in the longitudinal direction.

13. The method for assisting driving of a vehicle according to claim 8, further comprising:
  determining the similarity between the first obstacle and the third obstacle by comparing the stored information of the first obstacle with information of the recognized third obstacle.

14. The method for assisting driving of a vehicle according to claim 13, wherein the determining of the similarity between the first obstacle and the third obstacle comprises comparing at least one of a lateral speed, an area, or a color of each of the first obstacle and the third obstacle.

15. The method for assisting driving of a vehicle according to claim 8, wherein the performing of collision avoidance control of the vehicle based on the similarity between the first obstacle and the third obstacle comprises:
  performing the collision avoidance control with full-braking of the vehicle if the similarity between the first obstacle and the third obstacle is determined to be greater than the first threshold value.

16. The method for assisting driving of a vehicle according to claim 8, further comprising:
  transmitting a control signal for generating a warning signal if the similarity between the first obstacle and the third obstacle is determined to be greater than a third threshold value, the third threshold value being smaller than the second threshold value.

17. A driver assistance system of a vehicle comprising:
  one or more sensors configured to acquire sensing data of an area outside of the vehicle; and
  a controller comprising at least one processor configured to process the sensing data and configured to:
  identify a first object moving towards a driving lane of the vehicle based on the acquired sensing data, and determine a collision avoidance response for avoiding collision with the first object;
  identify a third object moving towards the driving lane of the vehicle based on the acquired sensing data, after the one or more sensors sense that the first object is interrupted by a second object; and
  perform collision avoidance based on the collision avoidance response for avoiding collision with the first object in response to determining a similarity between the identified third object and the first object, wherein the controller is further configured to transmit a control signal for generating a warning signal if the similarity between the identified third object and the first object is determined to be greater than a threshold value.

18. The driver assistance system of claim 17, wherein the controller identifies the third object moving towards the driving lane of the vehicle prior to a predicted collision time between the vehicle and the identified first object.

19. The driver assistance system of claim 17, wherein the controller determines that sensing of the first object by the one or more sensors is interrupted based on identifying the second object disposed between the vehicle and the identified first object.

20. The driver assistance system of claim 19, wherein the controller identifies the third object as an object having entered a field of sensing of the one or more sensors from behind the identified second object.

21. A vehicle comprising:
the driver assistance system of claim 17; and
a braking system and a steering system controlled by the driver assistance system to perform the collision avoidance response.

22. A driver assistance method comprising:
identifying a first object moving towards a driving lane of a vehicle based on sensing data acquired by one or more sensors of the vehicle sensing an area outside of the vehicle, and determining a collision avoidance response for avoiding collision with the first object;
identifying a third object moving towards the driving lane of the vehicle based on the acquired sensing data, after sensing that the first object is interrupted by a second object; and
performing collision avoidance based on the collision avoidance response for avoiding collision with the first object in response to determining a similarity between the identified third object and the first object; and
generating a warning signal if the similarity between the identified third object and the first object is determined to be greater than a threshold value.

23. The driver assistance method of claim 22, wherein the third object moving towards the driving lane of the vehicle is identified prior to a predicted collision time between the vehicle and the identified first object.

24. The driver assistance method of claim 22, further comprising:
determining that sensing of the first object by the one or more sensors has been interrupted based on identifying the second object disposed between the vehicle and the identified first object.

25. The driver assistance method of claim 24, further comprising:
identifying the third object as an object having entered a field of sensing of the one or more sensors from behind the identified second object.

26. The driver assistance method of claim 24, wherein the collision avoidance based on the collision avoidance response for avoiding collision with the first object is performed only after the vehicle has passed the identified second object.

27. The driver assistance method of claim 22, further comprising:
determining the similarity between the identified third object and the first object based on at least one of a lateral speed, an area, a size, or a color of each of the first and third objects.

28. A non-transitory computer-readable medium storing computer-executable instructions which, when executed by a processor, provide driving assistance functions comprising the steps of claim 22.

* * * * *